Feb. 23, 1937. D. H. COCKBURN 2,071,872
GRASS CUTTING MACHINE
Filed Oct. 22, 1934 4 Sheets-Sheet 1
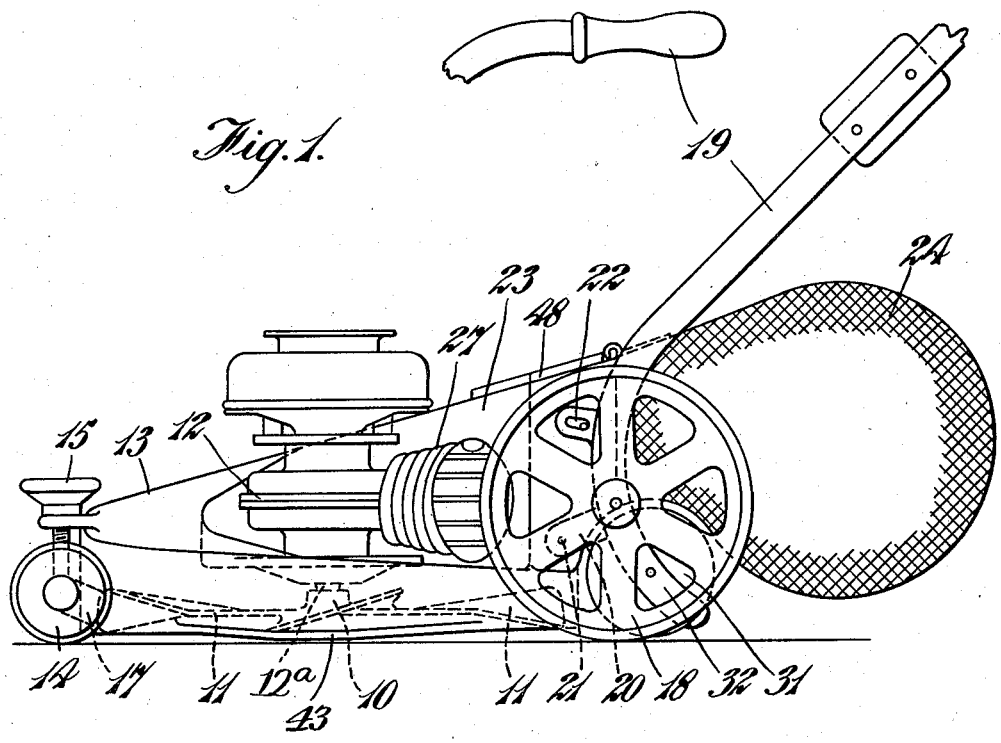
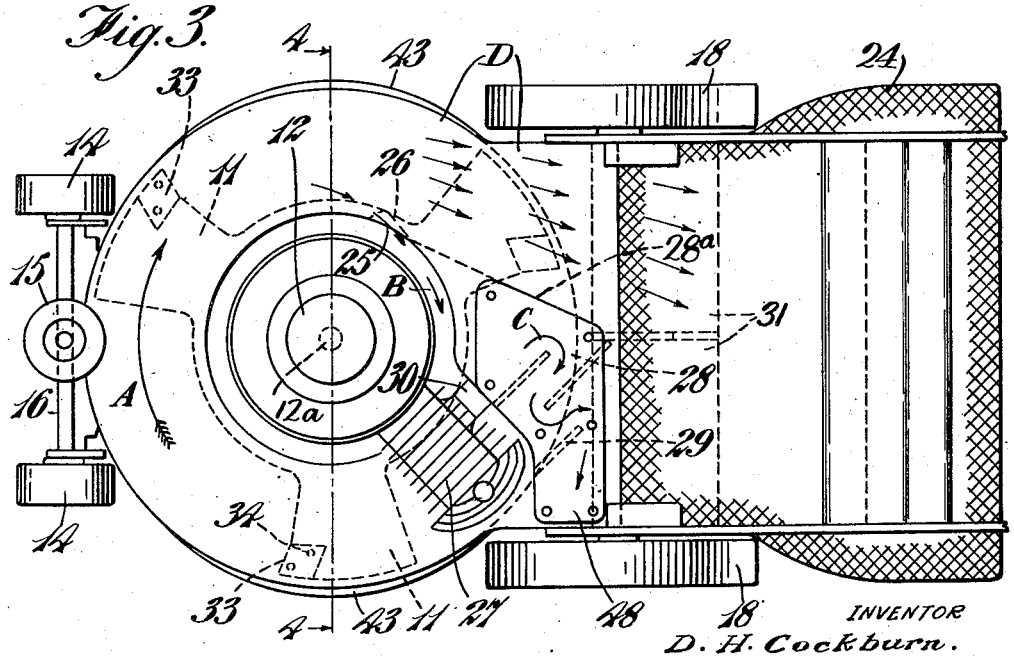
INVENTOR
D. H. Cockburn.
By Lacy & Lacy, Attys Feb. 23, 1937.　　D. H. COCKBURN　　2,071,872
GRASS CUTTING MACHINE
Filed Oct. 22, 1934　　4 Sheets-Sheet 2
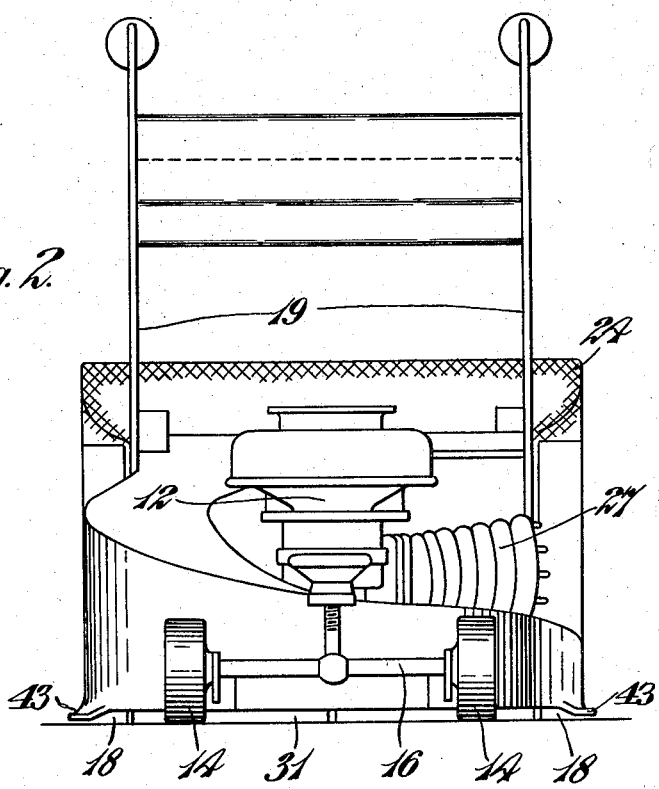
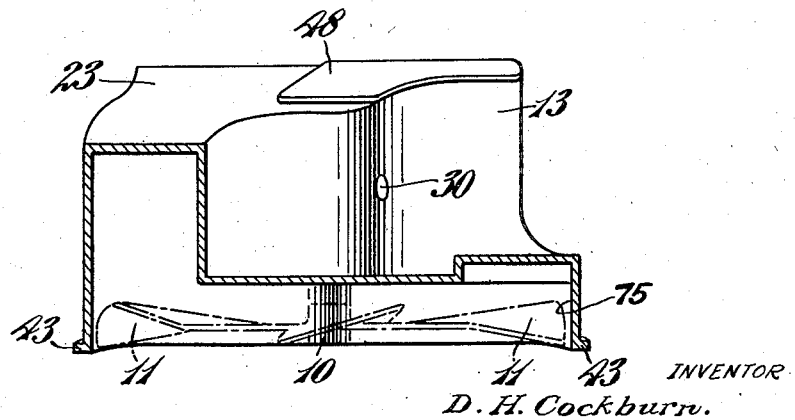
INVENTOR
D. H. Cockburn.
By Lacey & Lacey,
Attys Feb. 23, 1937. D. H. COCKBURN 2,071,872
GRASS CUTTING MACHINE
Filed Oct. 22, 1934 4 Sheets-Sheet 3

INVENTOR
D. H. Cockburn.
By Lacey & Lacey,
Attys.

Feb. 23, 1937.  D. H. COCKBURN  2,071,872
GRASS CUTTING MACHINE
Filed Oct. 22, 1934  4 Sheets-Sheet 4

INVENTOR
D. H. Cockburn.
By Lacey & Lacey,
Attys

Patented Feb. 23, 1937

2,071,872

UNITED STATES PATENT OFFICE 2,071,872

GRASS CUTTING MACHINE

David Hamilton Cockburn, Iver, England, assignor of one-half to Power Specialties Limited, Maidenhead, England Application October 22, 1934, Serial No. 749,466
In Great Britain October 24, 1933

5 Claims. (Cl. 56—25)

This invention relates to machines for cutting grass and the like, and particularly to those in which a rotating blade or blades are arranged to move in a substantially horizontal cutting plane, said blades being provided with air-impelling means whereby the cut grass is caused to flow into a receptacle conveniently disposed at the rear of the machine.

It is the object of the present invention to provide an improved form of construction which is more efficient that those which have hitherto been proposed and which, moreover, is comparatively cheap to produce.

In a machine for cutting grass or the like having one or more cutters arranged to rotate within or in close proximity to a casing and in a plane substantially parallel with the surface to be cut, the casing in accordance with the invention at all times embraces the cutters and is formed with a helically or spirally arranged passage through which the ascending cut grass or equivalent is caused to pass into a collecting receptacle. Moreover, in a machine for cutting grass or the like having a bladed impeller for drawing the grass upwardly by suction and cutting edges attached to or formed upon said impeller, in accordance with the invention said impeller is enclosed in a casing having its interior formed as a circular passage the cross-sectional area of which increases progressively in a circumferential direction, and the part of greatest cross-sectional area being connected to a receptacle for collecting the cut grass. The casing may be formed at its sides with downwardly extended portions for protecting the impeller, and the latter may be fitted with attached cutting members which are arranged to be shifted angularly relative to the impeller so as to bring a fresh cutting edge into operation. The rear part of the casing may be supported in the known manner upon a pair of wheels, but the latter are preferably recessed into the casing, the overall width across the wheel track being equal to or less than the cutting diameter of the impeller, while, if desired, a roller may be provided in addition, said roller being disposed between the wheels and being arranged so that the lowest part of its curved surface lies just above the lowest part of the peripheries of the wheels. Moreover a single casing may be provided with a plurality of cutting rotors which revolve side by side about peripheral axes, and which discharge the cut grass into a common receptacle, said rotors each comprising a bladed fan, the tips of the blades of which are arranged with cutting edges. The rotors may be driven in opposite directions and are preferably arranged to approach one another at the front of the casing, so that the cut grass is delivered to the receptacle through a passage extending along the centre of the casing. In cases where the rotor or rotors is driven by an internal combustion engine, a silencer shell may conveniently be formed integrally with the main casing, and also a part of the air draught produced by the rotor may be deflected towards the centre of the casing so as to be used for cooling the motor by which the rotor is driven.

The invention is illustrated by way of example in the accompanying diagrammatic drawings, in which:

Figure 1 is a side elevation of a grass cutter driven by an internal combustion engine;

Figure 2 is a front elevation corresponding to Figure 1;

Figure 3 is a plan view also corresponding thereto;

Figure 4 is a fragmentary section taken on the line 4—4 of Figure 3, the driving motor being omitted;

Figure 5:
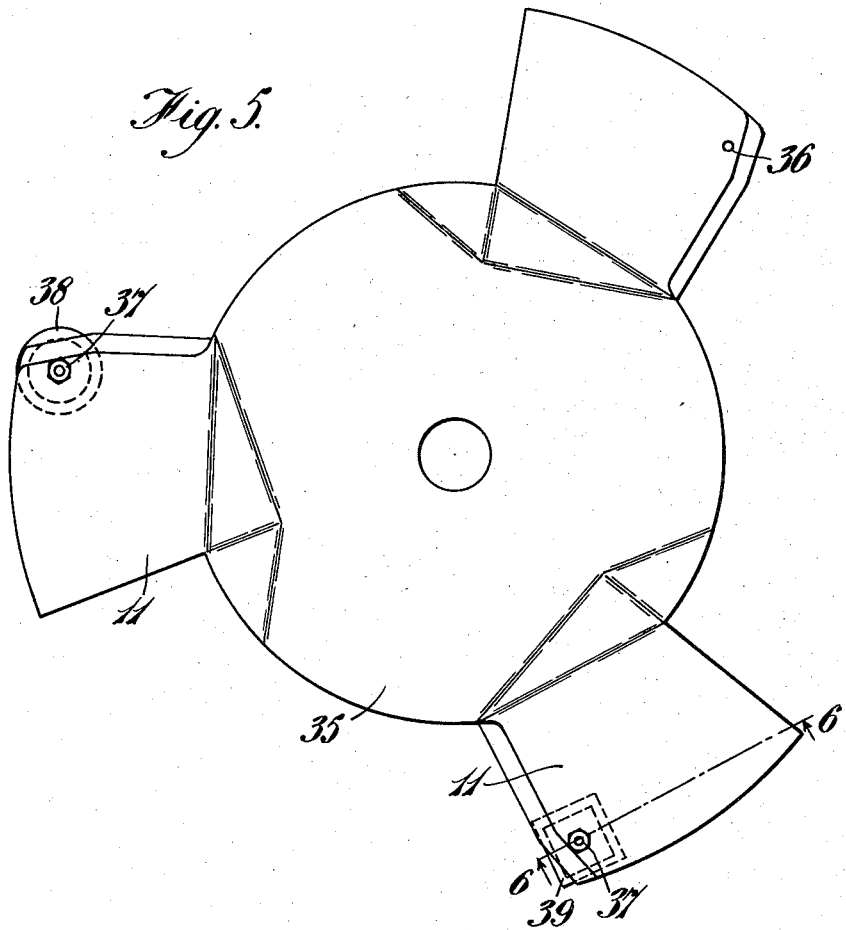
Figure 5 shows to an enlarged scale a plan view of the impeller illustrating modified forms of cutter.

In the construction of machine shown in Figures 1 to 4, an impeller 10 having blades 11 is mounted directly upon a vertical spindle 12a such as the crankshaft of an engine, indicated generally at 12, said engine being itself attached to a casing 13 the lower part of which surrounds the impeller 10. The front part of the casing 13 is carried by a pair of wheels 14 which are adjustable vertically by means of a hand wheel 15, the front spindle 16 being carried by links 17 for this purpose.

The rear part of the casing 13 is borne by a pair of rear wheels 18, each mounted upon a respective handle bar 19. A lug 20 is itself pivoted to the casing 13 at 21, so that pivotal movement of the handle bars 19 serves to raise and lower the rear part of the casing 13, clamping means being provided comprising a slotted lug 22 engaging a pin on the casing 13, said pin conveniently being provided with a suitable thumb nut.

The casing 13 is substantially circular in plan, as will be seen from Figure 3, and its lower part is in the form of a circular opening 75 within which the impeller 10 rotates. As will be seen in Figures 1, 2 and 4, the outer part of the casing 13 is substantially helical in formation, the vertical height increasing progressively in the direction of rotation of the impeller which is shown by the arrow A in Figure 3. The portion of greatest height which is indicated at 23, communicates with a receptacle 24 conveniently of wire mesh or other perforated material for collecting the cut grass. In action, the rotation of the impeller 10 draws in a current of air through the open bottom of the casing 13, the grass is cut by the tips of the blades 11, and the air, which follows a circumferential path within the casing 13, blows the cut grass in the direction of the arrows D into the receptacle 24 and then escapes through the perforations in the latter. Owing to the centrifugal tendency, the stream of cut grass tends to follow the outer part of the casing 13, so that a part of the draught can be utilized for cooling the cylinder of the engine 12. For this purpose an aperture 25 is formed in the casing 13 and is fitted with an outwardly extending deflector 26 which, intercepting some of the air, moving circumferentially within the casing causes said air to pass in the direction of the arrows B through the aperture 25 in the casing wall and thence to blow upon the cylinder 27 of the engine 12.

A part of the casing 13 is also utilized to form a silencer for the engine 12, a portion 28 being partitioned off at 28a from the helical or spiral passage and being fitted with baffle plates 29, so that exhaust gases passing from the engine port 30 traverse the path indicated by the arrows C and escape from the silencer chamber 28 through an aperture formed in the side of the casing 13. A lid 48 closes the upper part of the silencer 28.

In order to produce a rolling and flattening action upon the cut lawn surface, a roller 31 is rotatably mounted between extensions 32 formed at the lower ends of the handle bars 19, and this roller is preferably arranged so that its lowermost part is disposed just above the level of the corresponding part of the wheels 18 so that the greater part of the weight of the machine is taken by the latter, which wheels 18 being of large diameter, ensure that a minimum effort shall be required to wheel the machine over the ground.

As previously mentioned, the impeller 10 is arranged to cut the grass in the manner of a scythe, and for this purpose each of the blades 11 is provided with a removable cutter 33 held in position by means of a pair of bolts indicated at 34 so that when one corner of the cutter is worn said cutter can be reversed for bringing the opposite corner into operation.

Figure 6:
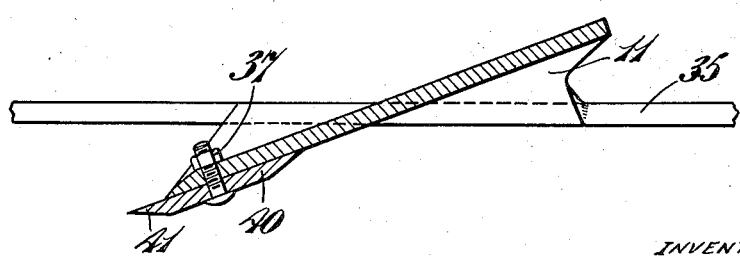
Figure 6 shows to a further enlarged scale a section on the line 6—6 of Figure 5.

The construction of the impeller as well as modified forms of cutter are shown in Figures 5 and 6, from which it will be seen that the impeller comprises a circular plate 35 having the blades 11 formed integrally therewith. In a slightly modified construction each of the blades is formed with a single hole 36 for the reception of a bolt and nut 37 securing the cutter. A circular form of cutter is indicated at 38 and is arranged to be turned progressively through a small angular movement for bringing a fresh cutting surface into operation. Similarly, a square cutter is shown at 39 and this form enables four separate cutting edges to be presented in turn.

The general form of the cutters is indicated in Figure 6, from which it will be seen that they are constituted by small plates 40 which are chamfered around their edges and upon their undersides as indicated at 41.

Figure 7:
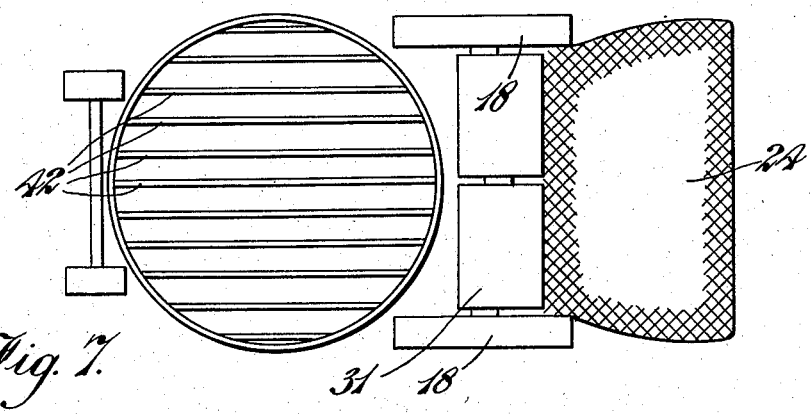
Figure 7 is an underneath plan view of the machine to a reduced scale.

If desired, a shield or grill can be provided beneath the impeller 10 for the purpose of protecting the latter and for preventing the entrance of stones and other articles into the machine. This is shown diagrammatically in Figure 7, in which a number of parallel wires or bars 42 forming the grill extend across the opening in the lower part of the casing 13, the wires or bars 42 being, if desired, bent upwardly and then outwardly at their ends so that the general level of the grill lies below the bottom of the casing. At each side of the casing a flange 43 extends outwardly, and is slightly dropped relative to the remainder of the lower opening to serve as a shield to prevent the lower part of the machine between the wheels 14, 14 and the wheels 18, 18 from damaging or cutting into an uneven or undulating lawn surface. On some, e. g. large machines, small rollers may be employed for the same purpose.

Figure 8:
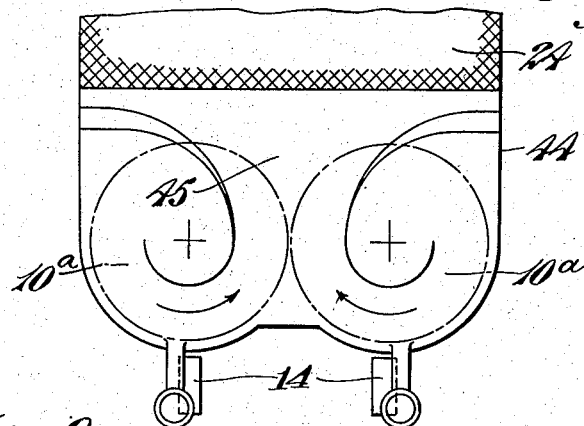
Figure 8 shows in plan a modified form of casing having a pair of inwardly rotating impellers.
Figure 9:
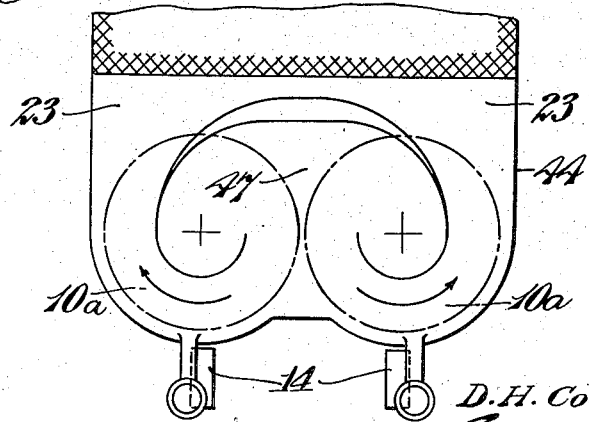
Figure 9 is a similar view of a casing suitable for a pair of outwardly rotating impellers.

It will be appreciated that the invention may be applied to various constructions of grass cutter, such, for instance, as those in which the impeller is driven by an electric motor, in which case the cooling air draught through the aperture 25 may or may not be required. Moreover, a plurality of impellers may be incorporated in a single machine, these being driven from a common engine or being provided each with a separate source of power. Such an arrangement is shown diagrammatically in Figures 8 and 9, in which a pair of impellers indicated at 10a are mounted side by side within a casing 44 having a perforated receptacle 24 for the cut grass. In Figure 8 the impellers are arranged to rotate towards each other as indicated by the arrows, and the centre part 45 of the casing therefore progressively increases in height so that that part of the casing 44 corresponding to each impeller is itself in the form of a helix. The opposite arrangement is shown in Figure 9, in which the impellers 10a rotate away from one another when viewed from the front. In this case the delivery of cut grass takes place at each side of the casing 44, but the arrangement provides a convenient recess 47 for the accommodation of the motor or motors and the associated driving mechanism. Other arrangements may, of course, be used, and in some instances it may be desirable to provide more than one impeller adapted to cut the grass in stages, for example by making an advanced impeller sever the long grass while a second impeller serves to effect a trimming operation.

What I claim is:—

1. A grass cutting machine comprising a substantially circular open bottomed casing, a vertical spindle passing through said casing, driving means at the upper end of the spindle, a bladed impeller and cutter on the lower end of said spindle, a guiding handle attached to the casing, vertically adjustable rotatable supporting means in front of the casing and rotatable supporting means behind said casing, the front and rear supporting means being not greater in width than the width of the casing, and shoes projecting downwardly from the sides of the casing intermediately of the front and rear thereof for preventing the cutter from impinging against bumps and ridges in the surface of the ground.

2. A grass cutting machine comprising a substantially circular open bottomed casing, a vertical spindle passing through said casing, driving means at the upper end of the spindle, a bladed impeller and cutter on the lower end of said spindle, a guiding handle attached to the casing, vertically adjustable rotatable supporting means in front of the casing, a pair of wheels behind and in close proximity to the casing, a roller disposed between said wheels, the front supporting means and the rear wheels being not greater in width than the width of the casing, and shoes projecting downwardly from the sides of the casing intermediately of the front and rear thereof for preventing the cutter from impinging against bumps and ridges in the surface of the ground.

3. A grass cutting machine comprising a substantially circular open bottomed casing, a vertical spindle passing through said casing, driving means at the upper end of the spindle, an impeller at the lower end of said spindle, fan blades upon said impeller arranged to produce an upward current of air, readily detachable cutting members upon the tips of the blades, a guiding handle attached to the casing, vertically adjustable rotatable supporting means in front of the casing and rotatable supporting means behind said casing, the front and rear supporting means being not greater in width than the width of the casing, and shoes projecting downwardly from the sides of the casing at positions midway between the front supporting means and the rear wheels for preventing the cutter from impinging against bumps and ridges in the surface of the ground.

4. A grass cutting machine comprising an open bottomed casing formed with a grass delivery opening at the rear, a pair of vertical spindles passing through said casing which spindles are positioned in substantially the same vertical plane and adapted to rotate in opposite directions, driving means connected with the upper ends of said spindles, a bladed impeller and cutter at the lower end of each of said spindles, said impellers and cutters being arranged to rotate side by side in substantially the same plane, a guiding handle attached to the casing, vertically adjustable rotatable supporting means in front of the casing, rotatable supporting means behind said casing, the front and rear supporting means being not greater in width than the width of the casing, and shoes projecting downwardly from the sides of the casing at positions midway between the front supporting means and the rear wheels for preventing the cutters from impinging against bumps and ridges in the surface of the ground.

5. A grass cutting machine comprising an open bottomed casing formed with a grass delivery opening at the rear, a pair of vertical spindles passing through said casing which spindles are positioned in substantially the same vertical plane and adapted to rotate in opposite directions, driving means connected with the upper ends of said spindles, a bladed impeller and cutter at the lower end of each of said spindles, said impellers and cutters being arranged to rotate side by side in substantially the same plane, a guiding handle attached to the casing, vertically adjustable rotatable supporting means in front of the casing, rotatable supporting means behind said casing, the front and rear supporting means being not greater in width than the width of the casing, and shoes projecting downwardly from the sides of the casing at positions midway between the front supporting means and the rear wheels for preventing the cutters from impinging against bumps and ridges in the surface of the ground, said front portions of the impellers and cutters being adapted to rotate toward one another.

DAVID HAMILTON COCKBURN.